US006404989B2

(12) United States Patent
Odaka

(10) Patent No.: US 6,404,989 B2
(45) Date of Patent: Jun. 11, 2002

(54) FLASH DEVICE

(75) Inventor: Yukio Odaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/735,344

(22) Filed: Dec. 12, 2000

(30) Foreign Application Priority Data

Dec. 14, 1999 (JP) .......................................... 11-354994

(51) Int. Cl.[7] .............................................. G03B 15/05
(52) U.S. Cl. ...................................................... 396/206
(58) Field of Search ................................ 396/205, 206; 315/241 P

(56) References Cited

U.S. PATENT DOCUMENTS 6,005,352 A * 12/1999 Odaka ................. 315/241 P X
6,219,493 B1 * 4/2001 Aoki et al. ................. 396/206

* cited by examiner

*Primary Examiner*—W. B. Perkey
(74) *Attorney, Agent, or Firm*—Robin, Blecker & Daley

(57) ABSTRACT

A flash device having a charging circuit which is arranged to be capable of changing between a flyback-type boosting action and a forward-type boosting action. The flyback-type boosting action is performed in the initial stage of a charging process and, after that, is changed over to the forward-type boosting action. The arrangement permits a charging action to be efficiently carried out.

30 Claims, 10 Drawing Sheets

FLASH DEVICE

BACKGROUND OF THE INVENTION

1. Field of the Invention

The present invention relates to a flash device and a camera having the flash device.

2. Description of Related Art

It has recently become popular to incorporate an electronic flash device into a camera for the purpose of a reduction in size of a camera system. With regard to the camera body, it has become a general trend to equip cameras with zoom lenses instead of conventional fixed-focus lenses.

As a result, cameras of these days permit taking an enlarged picture of an object of shooting located far away, by setting the zoom lens at a telephoto position where it has a long focal length. Meanwhile, the magnification rate of a lens has advanced to make the F-number which indicates the brightness of the lens on the telephoto side larger. The larger F-number so to say indicates a darker lens. The darker lens requires a flash device to be arranged to have greater light emission energy.

Such being the situation, a built-in flash device which is incorporated in a camera is generally arranged to require a large amount of flash-device charging energy and a large main-capacitor discharging energy for each shot of flash photography. On the other hand, however, a general desire for reduction in size of cameras urges use of a smaller power supply battery. As a result, the battery has come to have a smaller capacity.

However, it is deemed to be prerequisite to a flash device to have a high charging speed. Therefore, a charging circuit which charges a main capacitor by boosting the voltage of a battery is generally arranged to derive large energy from the power supply battery by raising the turn ratio of a transformer according to the so-called forward converter method.

The flash device having such a charging circuit is, however, inferior in the efficiency of use of energy of the battery. Therefore, under the requirement for a reduction in size of the battery and an increase in charging and discharging energy, it has been desired to enhance the efficiency of use of the battery energy in charging the main capacitor.

BRIEF SUMMARY OF THE INVENTION

It is an object of the invention to provide a flash device arranged to enhance the efficiency of use of battery energy for charging a main capacitor thereof, and also a camera having the flash device.

To attain the above object, in accordance with an aspect of the invention, there is provided a control circuit for a flash device having a main capacitor, a charging circuit having a flyback-type boosting circuit and a forward-type boosting circuit which differ in characteristic from each other and arranged to charge the main capacitor by boosting a voltage of a battery with one of the flyback-type boosting circuit and the forward-type boosting circuit, and a flash discharge tube arranged to emit flash light by discharging electric charge charged in the main capacitor, the control circuit comprising a detecting circuit which detects a charged state of the main capacitor, and a selection circuit which selectively causes one of the flyback-type boosting circuit and the forward-type boosting circuit to act, on the basis of a result of detection provided by the detecting circuit.

In accordance with another aspect of the invention, in a flash device having a charging circuit which performs a boosting action on a battery voltage in a flyback-type manner and in a forward-type manner, and a capacitor arranged to be charged by the charging circuit, the boosting action is performed in the flyback-type manner at the time of beginning of charging the capacitor.

In accordance with a further aspect of the invention, in a flash device having a charging circuit which performs a boosting action on a battery voltage in a flyback-type manner and in a forward-type manner, and a capacitor arranged to be charged by the charging circuit, the boosting action is set to one of the flyback-type manner and the forward-type manner according to a charged voltage state of the capacitor.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

In the case of each of the embodiments described below, the invention is applied to a camera in which a flash device is incorporated.

(First Embodiment)

Figure 1:
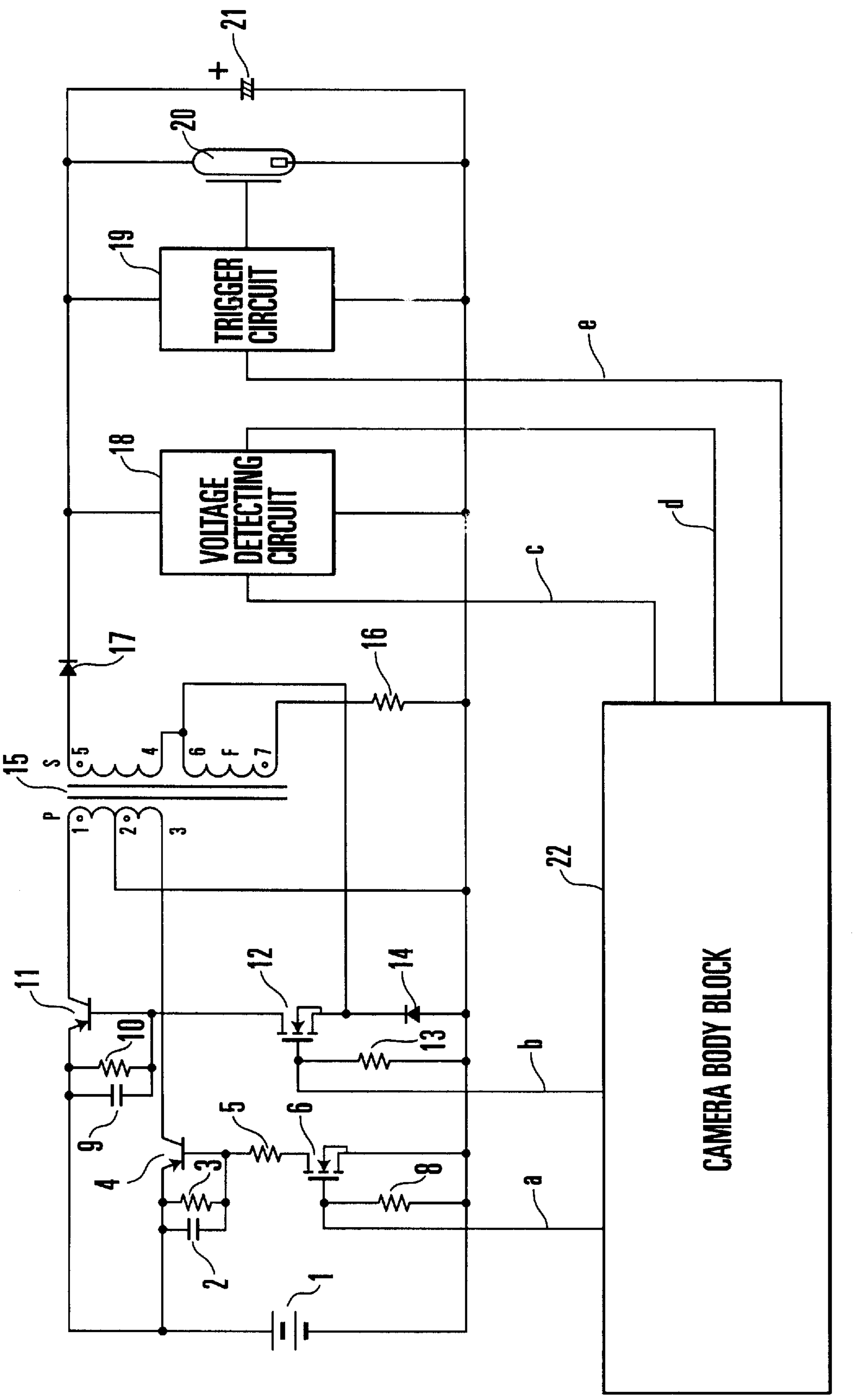
FIG. 1 is a circuit diagram showing the arrangement of a flash device circuit, according to a first embodiment of the invention, in a camera in which a flash device is incorporated.
Figure 2:
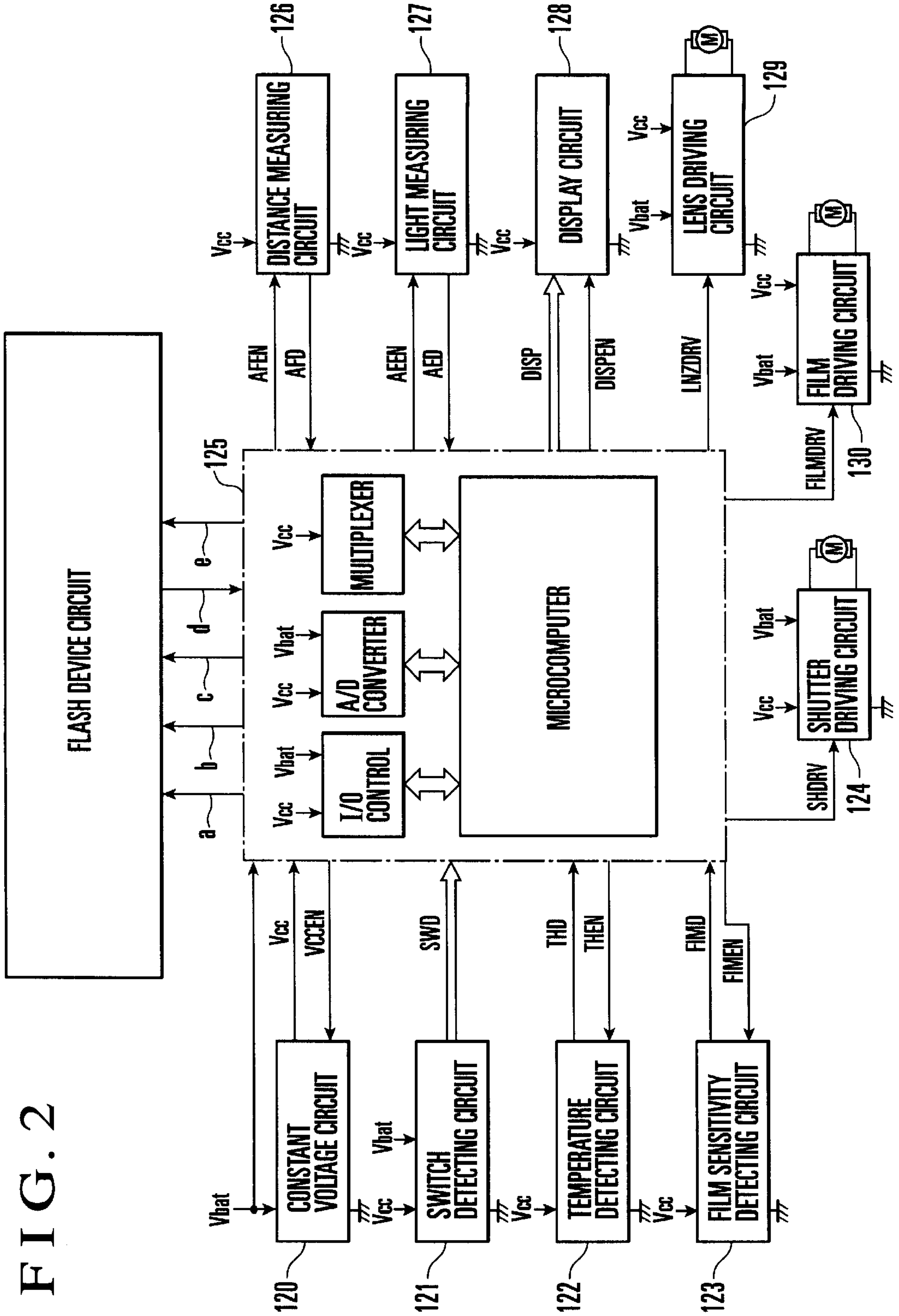
FIG. 2 is a block diagram showing the arrangement of circuits on the side of a camera body including a CPU which controls the flash device circuit, according to each embodiment of the invention.

FIG. 1 is a circuit diagram showing the arrangement of a flash device circuit, according to a first embodiment of the invention, in the flash-device-incorporated camera. FIG. 2 is a block diagram showing the circuit arrangement on the side of a camera body including a CPU which controls the flash device circuit, according to each embodiment of the invention.

Referring to FIG. 1, the circuit arrangement of the flash device circuit according to the first embodiment is first described. In FIG. 2, a battery 1 is used for a power supply. The flash device circuit includes a capacitor 2, a resistor 3 and a first oscillation transistor 4. A parallel circuit composed of the capacitor 2 and the resistor 3 is connected between the base and emitter of the first oscillation transistor 4. The flash device circuit further includes a resistor 5, an FET (field effect transistor) 6 arranged as a first switch element, and a pull-down resistor 8 for the control terminal of the first switch element 6.

The flash device circuit further includes a capacitor 9, a resistor 10 and a second oscillation transistor 11. A parallel circuit composed of the capacitor 9 and the resistor 10 is connected between the base and emitter of the second oscillation transistor 11. The flash device circuit further includes an FET 12 arranged as a second switch element, a resistor 13, and a diode 14. The resistor 13 is connected to the second switch element 12 as a pull-down resistor for the control electrode thereof. The diode 14 has its anode connected to the negative pole of the battery 1 and its cathode connected to the second switch element 12.

An oscillation transformer 15 has a primary winding P which is provided with an intermediate tap (center tap). An intermediate electrode which is mounted on the intermediate tap is connected to the negative pole of the battery 1. In the oscillation transformer 15, the two ends of the primary winding P are connected respectively to the collector of the first oscillation transistor 4 and the collector of the second oscillation transistor 11. A junction between the secondary winding S and the feedback winding F of the oscillation transformer 15 is connected to the second switch element 12 and the cathode of the diode 14, as shown in FIG. 1.

A resistor 16 is connected to the feedback winding F of the oscillation transformer 15 for current limiting purposes. The flash device circuit further includes a high-voltage rectifying diode 17, a voltage detecting circuit 18, a trigger circuit 19, a discharge tube 20, and a main capacitor 21. The output terminal of the trigger circuit 19 is connected to the trigger electrode of the discharge tube 20. The discharge tube 20 is connected in parallel with the main capacitor 21. The voltage detecting circuit 18 is also connected in parallel with the main capacitor 21 for the purpose of detecting the voltage of the main capacitor 21.

The arrangement of the camera control circuit which controls the flash device circuit as well as other parts on the side of the camera body is next described. In FIG. 1, reference numeral 22 denotes a circuit block on the side of the camera body (hereinafter referred to as the camera body block). FIG. 2 shows in detail the camera body block 22, in which a microcomputer is provided. The camera body block 22 includes a CPU 125 arranged to control the whole camera and circuits of varied kinds arranged to be controlled by the CPU 125. The above-stated flash device circuit is connected to the CPU 125 through connection lines "a" to "e" and is controlled by the CPU 125.

As shown in FIG. 1, the connection line "a" is connected to the control electrode of the first switch element 6 of the flash device circuit, and the connection line "b" is connected to the control electrode of the second switch element 12. The connection line "c" is a voltage detection driving signal line provided for driving the voltage detecting circuit 18. The connection line "d" is arranged to output a voltage value of the main capacitor 21 detected by the voltage detecting circuit 18. When a voltage detection driving signal is received from the CPU 125 through the connection line "c", the voltage detecting circuit 18 detects the voltage of the main capacitor 21, divides the detected voltage and supplies the divided voltage to the CPU 125 through the connection line "d".

The connection line "e" is connected to the input terminal of the trigger circuit 19. When a light emission start control signal is received from the CPU 125 through the connection line "e", the trigger circuit 19 outputs a trigger voltage from its output terminal to cause the discharge tube 20 to emit flash light.

The circuits of varied kinds disposed on the side of the camera body as shown in FIG. 2 are next described. A constant voltage circuit 120 is arranged to supply the various circuits with electric power (VCC) under the control of the CPU 125 through a terminal VCCEN.

A switch detecting circuit 121, which is made operative by the battery or the VCC power supply, is arranged to transmit, through a terminal SWD to the CPU 125, information on the state and change of state of each of switches of varied kinds, such as a power supply switch, a release switch (SW1 and SW2) corresponding to a shutter release button, etc. The camera body block 22 further includes a temperature detecting circuit 122, a film sensitivity detecting circuit 123 which is arranged to obtain information on the film sensitivity and the number of frames of film, a distance measuring circuit 126 which is arranged to measure a distance to an object of shooting, and a light measuring circuit 127 which is arranged to measure the luminance of the object. These circuits are arranged to send necessary information to the CPU 125 through applicable terminals in response to control signals coming from the CPU 125.

A shutter driving circuit 124 is arranged to drive a shutter. A lens driving circuit 129 is arranged to drive a lens. A film driving circuit 130 is provided for transporting a film. These circuits are arranged to drive various motors to perform a shutter driving action, a lens driving action and a film transport action on the basis of control signals from the CPU 125. A display circuit 128 is composed of an LCD, etc., and is arranged to display the states of the camera body and the flash device circuit and necessary information to inform the user of these states and information.

Figure 3:
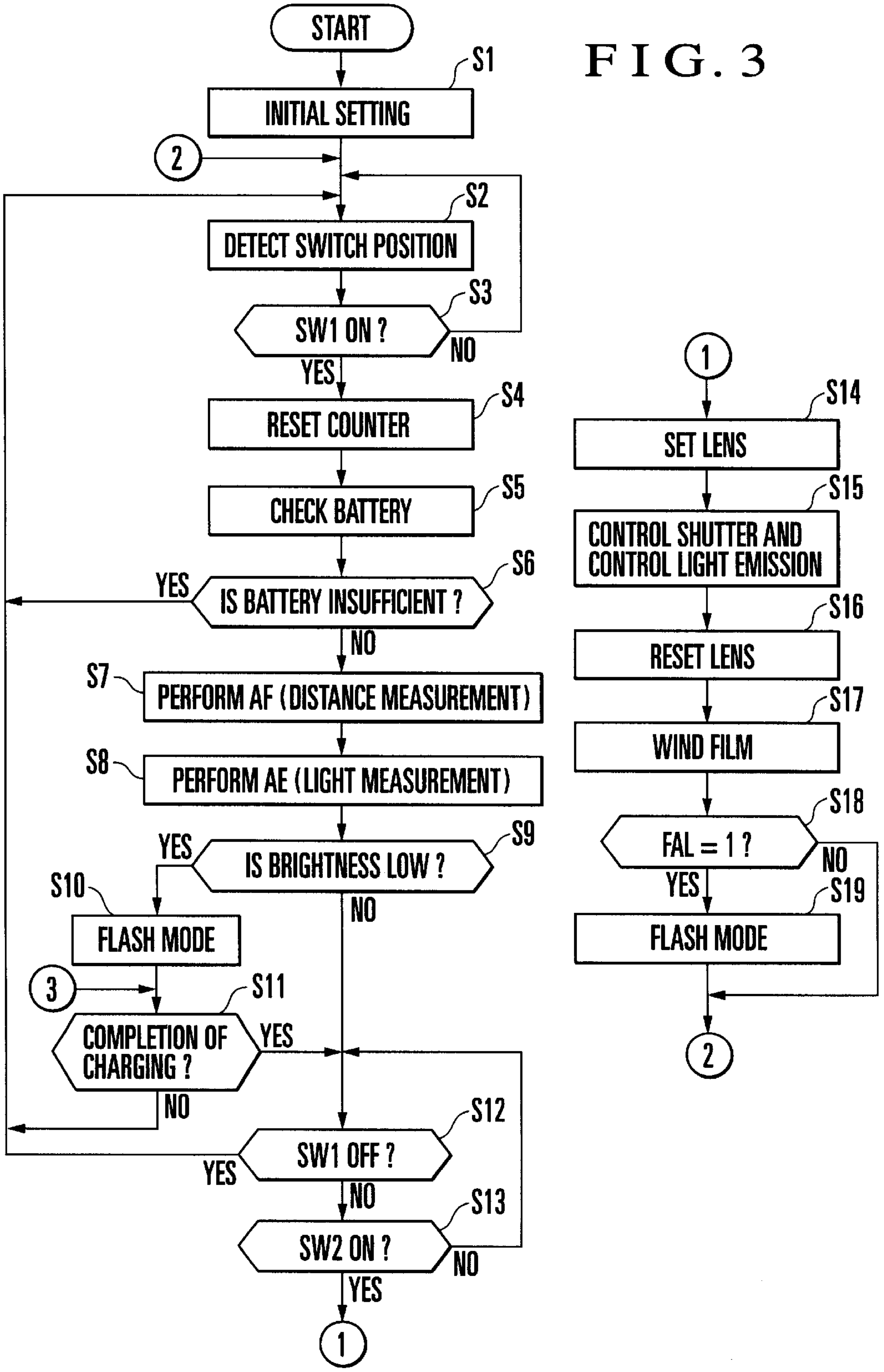
FIG. 3 is a flow chart showing the basic actions of the CPU and other parts.

Referring to the block circuit diagram of FIG. 2 and the flow chart of FIG. 3, the basic actions of the CPU 125 and other parts are described as follows. In the following description, the power supply on the side of the camera body block 22 is assumed to have been turned on and the CPU 125 is assumed not to be operating with the microcomputer in a low power consuming mode.

When a power supply switch (not shown) is turned on, the switch detecting circuit 121 detects the turning-on of the power supply switch and sends a detection signal to the CPU 125. This causes the microcomputer of the CPU 125 to begin to operate. The CPU 125 sends a signal through the terminal VCCEN to the constant voltage circuit 120. Then, the constant voltage circuit 120 supplies each circuit block with electric power Vcc to cause a flow of processes to begin from step S1.

At the step S1, the CPU 125 performs an initial setting action on the microcomputer. At step S2, on the basis of a detection signal from the switch detecting circuit 121, information necessary for a photo-taking shot is obtained.

At step S3, the CPU 125 waits until a first stroke signal indicating a state of having a release button pushed halfway for photo-taking preparation is sent from the switch detecting circuit 121 (steps S3 and S2). When the first stroke signal is obtained, the flow of operation proceeds from the step S3 to step S4. At the step S4, a predetermined counter is reset to its initial position.

At the next step S5, the CPU 125 makes a battery check. At step S6, a check is made to find if the power supply is in a state necessary for photo-taking by the camera. If not, the flow returns to the step S2. If so, the flow proceeds to step S7. At the step S7, a distance measuring action is controlled for automatic focusing (AF). In performing control over the distance measuring action, the CPU 125 sends a control signal from a terminal AFEN to render the distance measuring circuit 126 operative. Then, a distance to the object is measured on the basis of distance measurement information sent from the distance measuring circuit 126 through a terminal AFD.

At step S8, the CPU 125 sends a control signal from a terminal AEEN to render the light measuring circuit 127 operative. Then, the luminance of the object is measured on the basis of luminance information sent from the light measuring circuit 127 through a terminal AED. At step S9, a check is made to find if the object luminance is darker than a predetermined luminance value. If so, the flow proceeds to step S10 for a flash mode.

Figure 4:
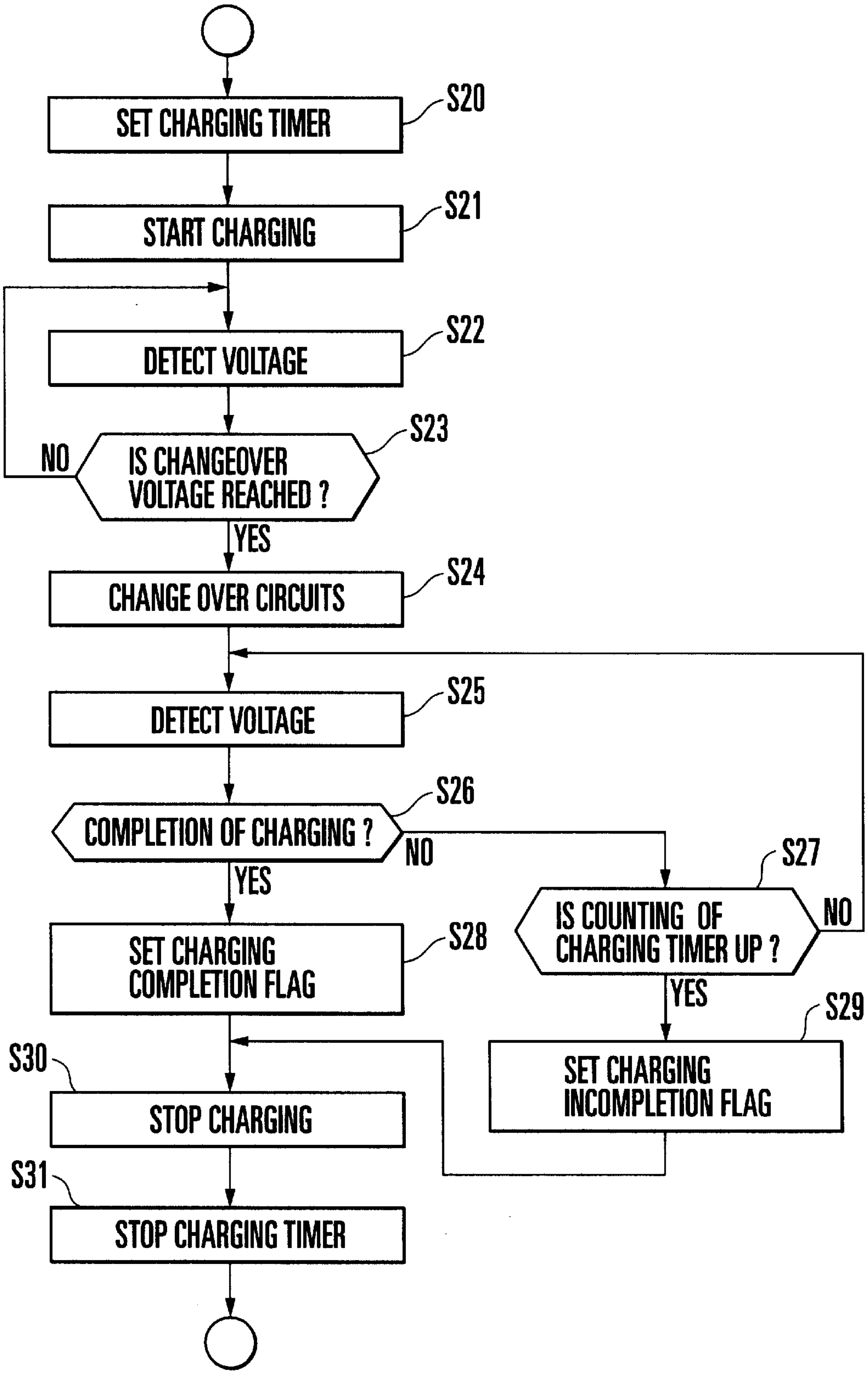
FIG. 4 is a flow chart showing actions to be performed in a flash mode.

The operation in the flash mode at the step S10 is shown in the flow chart of FIG. 4.

In the flash mode, at step S20 of FIG. 4, the CPU 125 first sets a charging timer, which is arranged to cut off a charging process when the charging time becomes longer than a period of time of, for example, 10 to 15 sec. or thereabout. At the next step S21, the CPU 125 gives a predetermined oscillation signal to the control electrode of the first switch element 6 through the connection terminal "a" shown in FIG. 1. The predetermined oscillation signal is a signal (pulse signal) for separate excitation which is outputted at low and high levels repeating in a predetermined cycle.

At the flash device circuit, when the high level signal is given to the control electrode of the first switch element 6, the first switch element 6 turns on to cause the base current of the first oscillation transistor 4 to flow through the current limiting resistor 5. Then, with the first oscillation transistor 4 rendered conductive, a collector current which is "hfe" times as large as the base current flows in a loop of "the positive pole of the battery 1-the emitter and collector of the first oscillation transistor 4-the intermediate terminal of the primary winding P of the oscillation transformer 15-the negative pole of the battery 1".

Therefore, an induced electromotive force is generated at the secondary winding S of the oscillation transformer 15. However, since the induced electromotive force is of such a polarity that is blocked by the high-voltage rectifying diode 17, no excitation current flows from the oscillation transformer 15, so that energy is stored in the oscillation transformer 15.

When the low level signal is next given to the control electrode of the first switch element 6, the first switch element 6 turns off to cut off the base current of the first oscillation transistor 4. The first oscillation transistor 4 thus becomes nonconductive to generate a back electromotive force at the secondary winding S of the oscillation transformer 15. Then, the energy stored in the oscillation transformer 15 is discharged by the back electromotive force. At this time, a current flows in a loop of "the high-voltage rectifying diode 17-the main capacitor 21-the diode 14". Then, electric charge is accumulated at the main capacitor 21.

When the high level signal is given again to the control electrode of the first switch element 6 with the energy discharged further from within the oscillation transformer 15, the first switch element 6 and the first oscillation transistor 4 are again rendered conductive to allow the oscillation transformer 15 to store energy. After that, a low level signal next given to the control electrode of the first switch element 6 renders the first switch element 6 and the first oscillation transistor 4 nonconductive. Then, the energy stored in the oscillation transformer 15 is discharged to charge the main capacitor 21 with electric charge. With these actions repeated in the flash device circuit, the potential of the main capacitor 21 rises. The manner in which the oscillation and the boosting action of the circuit arrangement are carried out as described above represents the so-called flyback converter method.

At step S22, while the above-stated actions are repeated to charge the main capacitor 21, the CPU 125 gives a voltage detection driving signal to the voltage detecting circuit 18 through the connection line "c". Then, by obtaining a divided voltage of the main capacitor 21 from the voltage detecting circuit 18 through the connection line "d", the CPU 125 detects the charged voltage of the main capacitor 21. The CPU 125 makes this voltage detection through an A/D converter shown in FIG. 2.

At the next step S23, the CPU 125 makes a check to find if the charged voltage of the main capacitor 21 has reached a predetermined voltage level. If not, the flow of operation returns to the step S22. If so, the flow proceeds to step S24.

At the step S24, the CPU 125 performs a charging circuit changeover process. The changeover process is performed in the following manner. The oscillation signal, i.e., a high-level/low-level signal, which has been outputted through the connection line "a" with the charged voltage of the main capacitor 21 being lower than a predetermined voltage is brought to a stop, after the charged voltage comes to exceed the predetermined voltage, and only a low level signal is outputted. Then, a high level signal is sent through the connection line "b" to the control electrode of the second switch element 12. By this, the first switch element 6 is kept in its off-state (nonconductive), while the second switch element 12 is turned on.

When the second switch element 12 is turned on in the flash device circuit, the base current of the second oscillation transistor 11 flows from the battery 1 through the emitter and base of the second oscillation transistor 11, the second switch element 12, the feedback winding F of the oscillation transformer 15 and the resistor 16. As a result, a collector current which is "hfe" times as large as the base current comes to flow to the negative pole of the battery 1 through the primary winding P and the intermediate terminal of the oscillation transformer 15.

This collector current causes an induced electromotive force to be generated at the secondary winding S of the oscillation transformer 15. By this, the main capacitor 21 is charged through a loop of "the high-voltage rectifying diode 17-the main capacitor 21-the battery 1-the base and emitter of the second oscillation transistor 11-the second switch element 12-the secondary winding S of the oscillation transformer 15-the high-voltage rectifying diode 17". Since the induced electromotive force, at the same time, becomes also the base current of the second oscillation transistor 11, the base current of the second oscillation transistor 11 comes back in an increased state. The return of the base current thus increased causes positive feedback to instantly bring a voltage between the collector and emitter of the second oscillation transistor 11 into a saturated state.

After the lapse of a period of time from the flow of the above-stated current, a magnetic flux within the core of the oscillation transformer 15 comes to saturate to generate a back electromotive force in each of the secondary winding S and the feedback winding F of the oscillation transformer 15. The back electromotive force generated in the secondary winding S of the oscillation transformer 15 gives a reverse bias to the base of the second oscillation transistor 11 through a loop of "the second switch element 12-the base and emitter of the second oscillation transistor 11-the battery 1-the main capacitor 21-the parasitic capacity of the high-voltage rectifying diode 17-the secondary winding S of the oscillation transformer 15". At the same time, the back electromotive force generated at the feedback winding F of the oscillation transformer 15 gives a reverse bias also to the base of the second oscillation transistor 11 through a loop of "the second switch element 12-the base and emitter of the second oscillation transistor 11-the battery 1-the resistor 16-the feedback winding F". Therefore, the second oscillation transistor 11 suddenly becomes nonconductive.

When the saturated state of a magnetic flux within the core of the oscillation transformer 15 is canceled, the base current of the second oscillation transistor 11 again flows to charge the main capacitor 21 by repeatedly rendering the second oscillation transistor 11 alternately conductive and nonconductive. The oscillating and boosting actions described above represent the so-called forward converter method.

At step S25 in FIG. 4, while the main capacitor 21 is in process of being charged in the above manner, the CPU 125 sends a voltage detection driving signal to the voltage detecting circuit 18 through the connection line "c" to obtain a divided voltage of the main capacitor 21 outputted from the voltage detecting circuit 18 through the connection line "d". The charged voltage of the main capacitor 21 is thus detected.

At the next step S26, the CPU 125 makes a check to find if the charged voltage of the main capacitor 21 has reached a charging completion voltage. If not, the flow proceeds to step S27 to find if the charging timer has counted a predetermined period of time. The steps S25, S26 and S27 are executed in a looped manner to make the check for the charged voltage. If the charged voltage of the main capacitor 21 reaches the charging completion voltage before the count-up of the charging timer, the flow proceeds from the step S26 to step S28. At the step S28, a charging completion flag is set to indicate the completion of charging, and the flow proceeds to step S30.

In a case where the count of the charging timer comes to an end before the charged voltage of the main capacitor 21 reaches the charging completion voltage, the flow proceeds from the step S27 to step S29. At the step S29, a charging incompletion flag is set to indicate that the charging action has not been finished, and the flow proceeds to step S30.

At the step S30, to bring the charging action to a stop, the CPU 125 turns off the second switch element 12 by shifting the level of the connection line "b" from a high level to a low level. At step S31, the action of the charging timer is brought to a stop, and the flow returns to the main routine shown in FIG. 3.

At step S11, after the flash mode, the CPU 125 checks the flag set up at the step S28 or S29 in the flash mode to find if the process of charging has been completed. If not, i.e., if the flag is the charging incompletion flag, the flow returns to the step S2. If so, i.e., if the flag is the charging completion flag, the flow proceeds to step S12.

At the step S12 and the next step S13, the CPU 125 checks the release switches SW1 and SW2 for their states. The flow of operation of the CPU 125 waits for a second stroke of the release button (full pushing operation on the release button) while monitoring the first stroke of the release button. When the release button is freed from the first stroke of operation thereon, the flow returns from the step S12 to the step S2. If the second stroke is made, the flow proceeds from the step S13 to step S14. At the step S14, the lens driving circuit 129 is caused to adjust the focusing state of the lens on the basis of distance measurement data obtained at the step S7. The flow then proceeds to step S15.

At the step S15, the CPU 125 controls through the shutter driving circuit 124 a shutter opening action according to the data of object luminance obtained at the step S8 and the film sensitivity. In a case where the luminance of the object is low requiring the use of flash light, the discharge tube 20 of the flash device circuit is caused to emit light at an aperture value apposite to the distance measurement data and the film sensitivity.

The discharge tube 20 is caused to emit light by giving a high level signal to the connection line "e" shown in FIG. 1. With the high level signal given to the connection line "e", a high pulse voltage is generated from the output terminal of the trigger circuit 19. The high pulse voltage is sent to the trigger electrode of the discharge tube 20 to excite the discharge tube 20. This excitation causes the impedance of the discharge tube 20 to drop at once. Then, the charged energy of the main capacitor 21 is discharged and converted into light energy to illuminate the object of shooting with light thus emitted. In a case where the discharge tube 20 is caused to emit light, the CPU 125 sets a flash flag FAL, which indicates the use of the flash device, to "1".

At step S16, when the opening of the shutter is controlled to close the shutter, the CPU 125 brings the lens, which has been at a focal point position, back to its initial position. At step S17, the film driving circuit 130 is caused to wind one frame portion of the film which has been used for taking a shot.

At the next step S18, the CPU 125 makes a check to find if the flash flag FAL is set at "1". If so, the flow proceeds to step S19 to shift the mode of the camera to the flash mode. At the step S19, the main capacitor 21 is charged, in the same manner as at the step S10, and a sequence of processes comes to an end. Further, if the flash flag FAL is found at the step S18 not to be at "1", a shot is considered to have been taken without using the flash device, and the flow returns from the step S18 to the step S2 without performing the process of charging the main capacitor 21.

Figure 5:
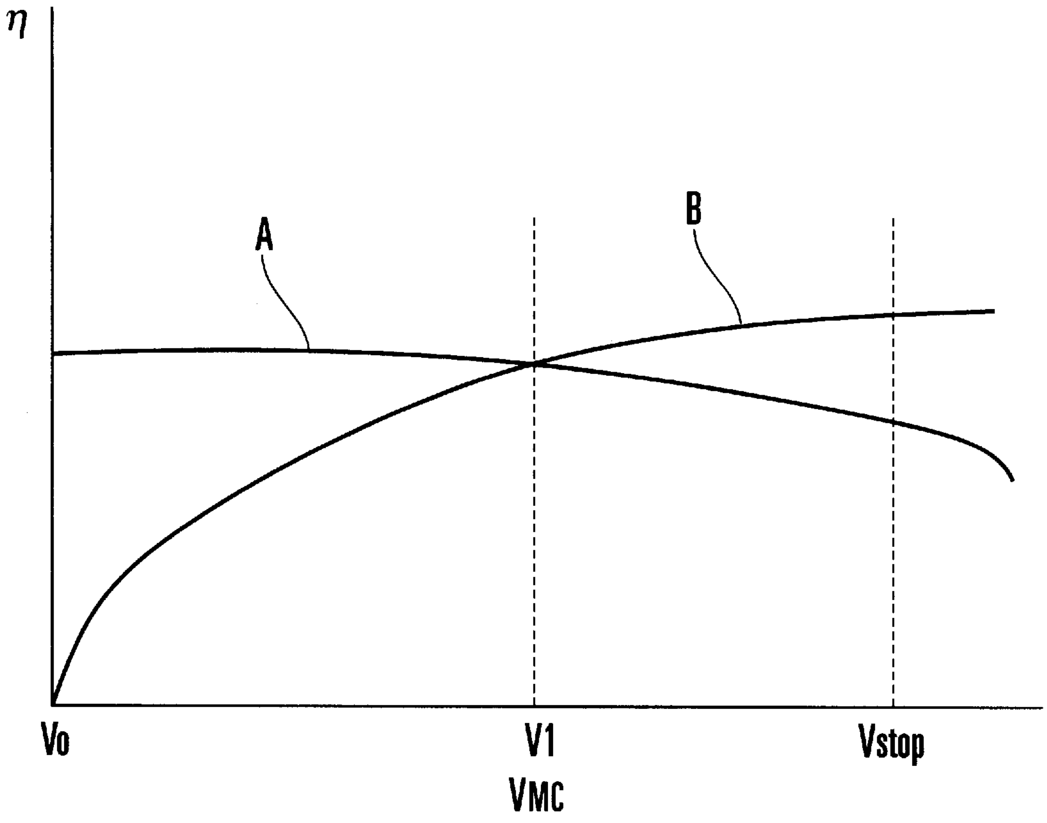
FIG. 5 is a graph showing the characteristic of a flyback-type converter and that of a forward-type converter in comparison with each other.

In the case of the first embodiment, as described above, the charging action is performed by using a boosting circuit of the flyback converter type (hereinafter referred to as the flyback type) when the charged voltage of the main capacitor 21 is lower than a predetermined level and by using a boosting circuit of the forward converter type (hereinafter referred to as the forward type) when the charged voltage of the main capacitor 21 exceeds the predetermined level. FIG. 5 shows the characteristics of the two types of boosting circuits. In FIG. 5, the abscissa axis shows the charged voltage ($V_{MC}$) of the main capacitor 21. The ordinate axis shows a rate of real-time efficiency ($\eta$), which is the ratio of the energy with which the main capacitor 21 is charged to the energy outputted from the battery. A curve "A" represents the efficiency of the converter of the flyback type and a curve "B" represents the efficiency of the converter of the forward type.

As apparent from FIG. 5, the characteristic of the converter of the flyback type is such that, with respect to the real-time efficiency for each of charging voltages, the input current from the battery does not change from the initially set current to show a flat characteristic, and the efficiency gradually drops accordingly as the charged voltage of the main capacitor 21 increases.

On the other hand, the characteristic of the converter of the forward type is as follows. As shown in FIG. 5, the efficiency is extremely poor when the charged voltage of the main capacitor 21 is low, but rapidly improves accordingly as the charged voltage increases. In other words, in the case of the converter of the forward type, the value of current increases accordingly as the charged voltage of the main capacitor 21 is lower. The so-called rush current flows at the time of initial charging. The battery energy using efficiency thus becomes extremely poor at that time.

The flash device circuit according to the first embodiment is, therefore, arranged as follows. The converter of the flyback type is changed over to the converter of the forward type at a point of time where a charged voltage of the main capacitor 21 becomes a predetermined voltage V1, indicated by a broken line in FIG. 5, at a part where the efficiency value of the converter of the flyback type crosses the efficiency value of the converter of the forward type between a charged voltage Vo of the main capacitor 21 obtained at the time of beginning of charging and a charging completion voltage Vstop, as shown in FIG. 5. The changeover arrangement enables the flash device circuit to obtain the efficient charging performances of the two different types of converters. The efficiency of use of the battery 1 thus can be enhanced. Incidentally, the changeover may be effected at a point in the neighborhood of the voltage V1.

(Second Embodiment)

Figure 6:
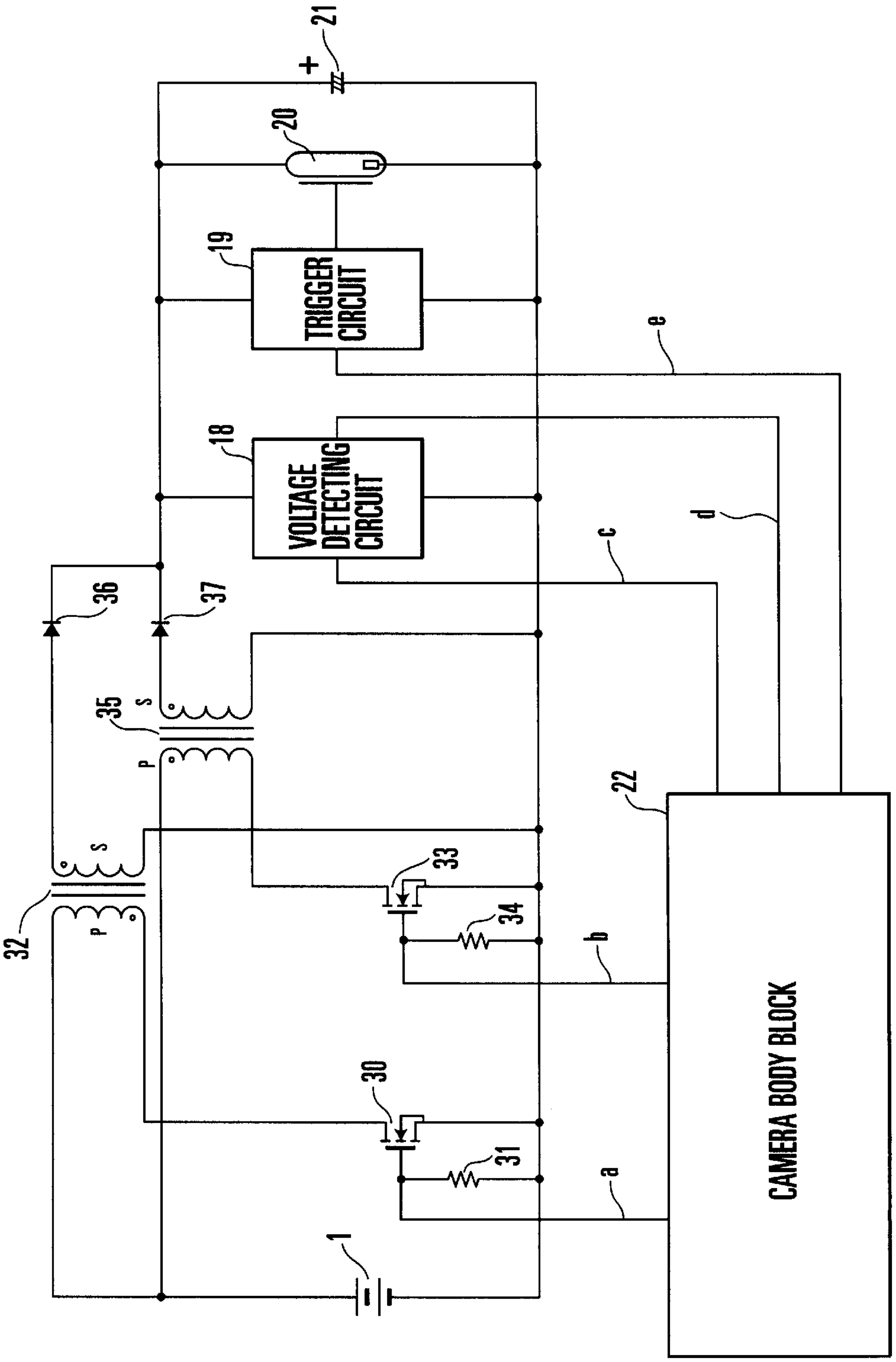
FIG. 6 is a block diagram showing the arrangement of a flash device circuit according to a second embodiment of the invention.

FIG. 6 shows the arrangement of a flash device circuit according to a second embodiment of the invention. The flash device circuit according to the second embodiment is arranged to make the changeover of use of separate-excitation converters of two different types by using two transformers. In FIG. 6, all parts that are the same as those of the first embodiment, such as the connection lines, etc., are indicated by the same reference numerals and symbols as those used for the first embodiment. The main routine of the sequence of control actions of the second embodiment is also the same as the flow chart shown in FIG. 3. For the second embodiment, therefore, only the arrangement of the flash device circuit and processes to be performed in the flash mode (steps S10 and S19 in FIG. 3) are described here.

Referring to FIG. 6, a battery 1 is used for a power supply. The flash device circuit includes an FET 30 which is a first oscillation element. The first oscillation element 30 has its control electrode connected to the connection line "a" of the CPU 125 disposed within the camera body block 22 and is arranged to be turned on (become conductive) and off (become nonconductive) by a predetermined oscillation signal outputted from the CPU 125 through the connection line "a". A resistor 31, which is arranged to serve as a pull-down resistance for the first oscillation element 30, is disposed between the control electrode of the first oscillation element 30 and the negative pole of the battery 1. A first transformer 32 has one end side of its primary winding P connected to the positive pole of the battery 1 and the other end side of the primary winding P connected to the negative pole of the battery 1 through the first oscillation element 30.

An FET 33 is a second oscillation element. A resistor 34 is arranged to serve as a pull-down resistance for the second oscillation element 33. The second oscillation element 33 has its control electrode connected to the connection line "b" of the CPU 125 and is arranged to be turned on or off by a predetermined oscillation signal outputted from the CPU 125 through the connection line "b". The resistor 34 is connected between the control electrode of the second oscillation element 33 and the negative pole of the battery 1. A second oscillation transformer 35 has one end side of its primary winding P connected to the positive pole of the battery 1 and the other end side of the primary winding P connected to the negative pole of the battery 1 through the second oscillation element 33, as shown in FIG. 6.

Diodes 36 and 37 are provided for rectifying a high voltage. Each of the high-voltage rectifying diodes 36 and 37 has its anode connected to the one end side of the oscillation transformer 32 or 35 and its cathode connected to one end side of the main capacitor 21. The other end side of the secondary winding of each of the oscillation transformers 32 and 35 is connected to the other end side of the main capacitor 21.

The camera body block 22, the voltage detecting circuit 18, the trigger circuit 19, the discharge tube 20 and the main capacitor 21 in the second embodiment are arranged in the same manner as the corresponding parts of the first embodiment described in the foregoing.

In the flash device circuit according to the second embodiment, the first oscillation transformer 32 is the converter of the flyback type, and the second oscillation transformer 35 is the converter of the forward type. A sequence of control actions of the flash device circuit according to the second embodiment is next described referring to the flow chart of FIG. 4 as follows.

At step S20 of FIG. 4, in the flash mode, the CPU 125 first sets the charging timer. At the step S21, to start charging, the CPU 125 gives a predetermined oscillation signal to the control electrode of the first oscillation element 30 through the connection line "a". The predetermined oscillation signal is a separatelyexciting signal which is outputted repeating a high level signal and a low level signal in a predetermined cycle, as mentioned in the foregoing.

In the flash device circuit, with the high level signal and the low level signal applied to the control electrode of the first oscillation element 30, the first oscillation element 30 is rendered conductive and nonconductive. When the high level signal is applied to the control electrode of the first oscillation element 30, the first oscillation element 30 becomes conductive to allow a current to flow from the battery 1 through the primary winding P of the first oscillation transformer 32 and the first oscillation element 30.

Therefore, an induced electromotive force is generated at the secondary winding S of the first oscillation transformer 32. However, since the induced electromotive force is of such a polarity that is blocked by the high-voltage rectifying diode 36, no excitation current flows from the first oscillation transformer 32, so that energy is stored in the first oscillation transformer 32.

When the low level signal is given to the control electrode of the first oscillation element 30, the first oscillation element 30 turns off (nonconductive) to generate a back electromotive force at the secondary winding S of the first oscillation transformer 32. The energy stored in the first oscillation transformer 32 is discharged by this back electromotive force. Then, a current flows in a loop of "the high-voltage rectifying diode 36-the main capacitor 21-the secondary winding S of the first oscillation transformer 32" to accumulate electric charge in the main capacitor 21.

When the high level signal is again given to the control electrode of the first oscillation element 30 with the energy discharged further from within the first oscillation transformer 32, the first oscillation element 30 again becomes conductive to allow energy to be stored in the first oscillation transformer 32 in the same manner. Then, the low level signal given to the control electrode of the first oscillation element 30 next time renders the first oscillation element 30 nonconductive to allow the stored energy of the first oscillation transformer 32 to be discharged and to allow the main capacitor 21 to be charged with electric charge. In the flash device circuit according to the second embodiment, these actions are repeated to cause the potential of the main capacitor 21 to rise.

At step S22, while the above-stated actions are repeated to charge the main capacitor 21, the CPU 125 detects the charged voltage of the main capacitor 21 by giving a voltage detection driving signal to the voltage detecting circuit 18 through the connection line "c" to obtain a divided voltage of the main capacitor 21 which is outputted from the voltage detecting circuit 18 through the connection line "d". This voltage detection is made through the A/D converter which is disposed at the CPU 125 shown in FIG. 2.

At step S23, the CPU 125 makes a check to find if the charged voltage of the main capacitor 21 has reached a predetermined voltage level V1 (shown in FIG. 5). If not, the flow of operation returns to the step S22. If so, the flow proceeds to step S24.

At the step S24, the CPU 125 performs a charging circuit changeover process. The changeover process is performed in the following manner. The oscillation signal, i.e., a high-level/low-level signal, which has been outputted through the connection line "a" with the charged voltage of the main capacitor 21 being lower than a predetermined voltage is brought to a stop, after the charged voltage comes to exceed the predetermined voltage, and only a low level signal is outputted. Then, the oscillation signal (the high-level/low-level signal) is sent through the connection line "b" to the control electrode of the second oscillation element 33. By this, the first oscillation element 30 is kept in its off-state (nonconductive), while the second oscillation element 33 is caused to take a state of repeatedly becoming conductive and nonconductive in a predetermined cycle.

Under this condition, when a high level signal is given to the control electrode of the second oscillation element 33, the second oscillation element 33 becomes conductive to allow a current to flow from the battery 1 through the primary winding P of the second oscillation transformer 35 and the second oscillation element 33.

Therefore, an induced electromotive force is generated at the secondary winding S of the second oscillation transformer 35. Then, since the directions of the primary winding and the secondary winding of the second oscillation transformer 35 differ from those of the first oscillation transformer 32, as shown in FIG. 6, the induced electromotive force comes to have such a polarity that is not blocked by the high-voltage rectifying diode 37. As a result, an excitation current flows from the second oscillation transformer 35 to allow the main capacitor 21 to be charged with electric charge through the high-voltage rectifying diode 37.

In the case of the flash device circuit, before the magnetic flux within the core of the second oscillation transformer 35 becomes saturated, a low level signal is given to the control electrode of the second oscillation element 33 to turn off (to render nonconductive) the second oscillation element 33 to annihilate the magnetic flux. Then, a high level signal is given again at the timing of the annihilation of the magnetic flux within the core. The electric charge is accumulated at the main capacitor 21 by thus repeatedly rendering the second oscillation element 33 conductive and nonconductive. As a result, the potential of the main capacitor 21 rises.

At step S25 of FIG. 4, while the main capacitor 21 is in process of being charged in the above manner, the CPU 125 sends a voltage detection driving signal to the voltage detecting circuit 18 through the connection line "c". The CPU 125 thus detects the charged voltage of the main capacitor 21 by obtaining a divided voltage of the main capacitor 21 from the voltage detecting circuit 18 through the connection line "d". After that, steps S26 to S29 are executed in the manner described in the foregoing.

At step S30, which is provided for bringing the process of charging the main capacitor 21 to a stop, the CPU 125 changes the level of the connection line "b" from a high level to a low level to turn off the second oscillation element 33 (render nonconductive). At the next step S31, the operation of the charging timer is brought to a stop, in the same manner as in the first embodiment, and the flow returns to the main routine shown in FIG. 3.

(Third Embodiment)

Figure 7:
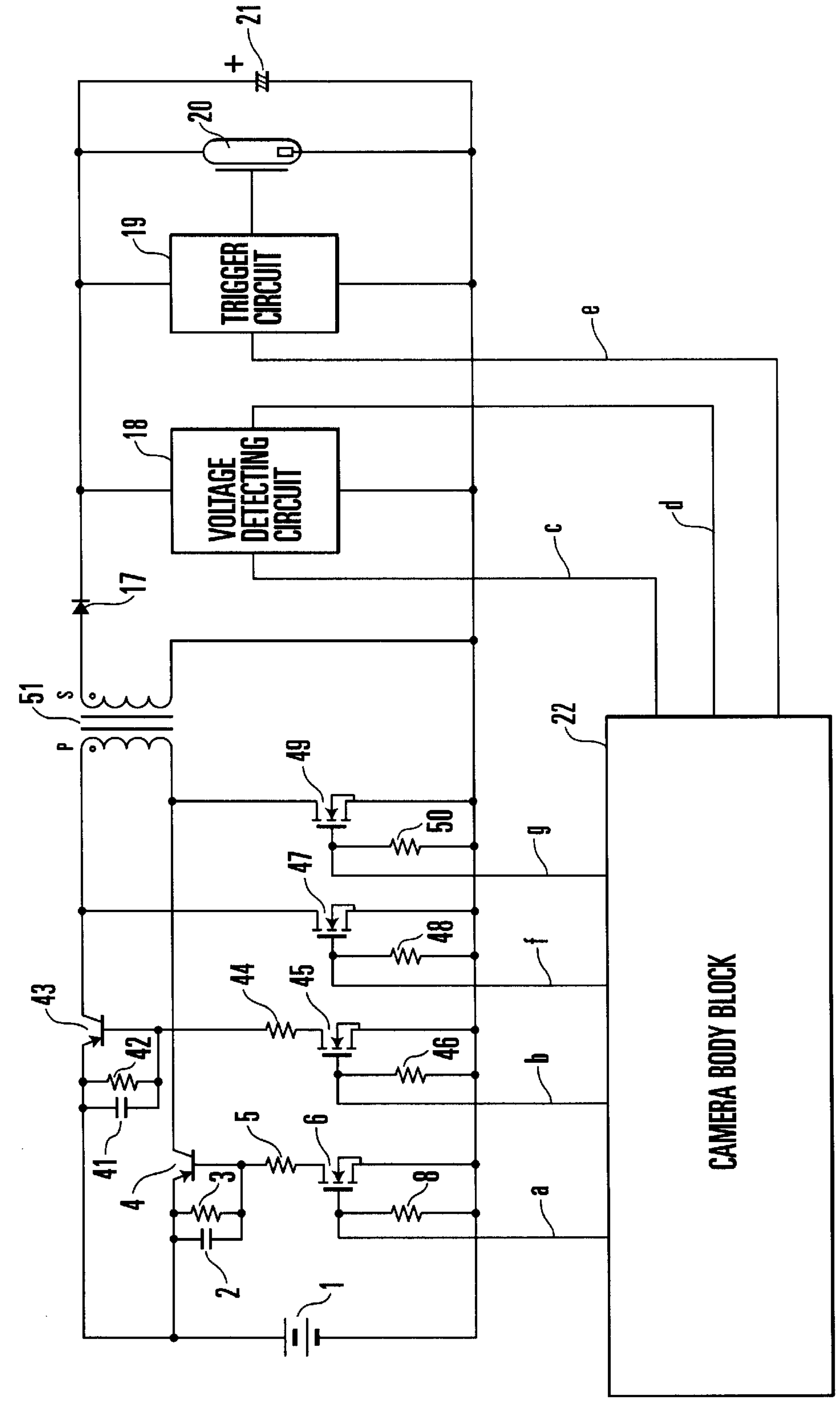
FIG. 7 is a block diagram showing the arrangement of a flash device circuit according to a third embodiment of the invention.

FIG. 7 shows the arrangement of a flash device circuit according to a third embodiment of the invention. In the case of the third embodiment, the flash device circuit uses one transformer and the changeover between charging with the converter of the flyback type and charging with the converter of the forward type is effected by switching the primary current of the transformer. In FIG. 7, all components, connection lines, etc., that are the same as those of the first embodiment described in the foregoing are indicated by the same reference numerals and symbols, and the details of them are omitted from the following description. The sequence of processes of the main routine shown in FIG. 3 and the sequence of control processes in the flash mode shown in FIG. 4 are executed by the third embodiment in the same manner as described in the foregoing. Therefore the following description covers only the arrangement and the charging action of the flash device circuit.

Referring to FIG. 7, the flash device circuit includes a capacitor 41, a resistor 42 and an oscillation transistor 43. A parallel circuit composed of the capacitor 41 and the resistor 42 is connected between the base and the emitter of the oscillation transistor 43.

The flash device circuit further includes a current limiting resistor 44, a switch element 45, a pull-down resistance 46 for the switch element 45, switch elements 47 and 49, and pull-down resistances 48 and 50 connected respectively for the switch elements 47 and 49.

In the third embodiment, as the connection lines for connection between the flash device circuit and the CPU 125 of the camera body block 22, there are additionally provided a connection line "f" connected to the control electrode of the switch element 47 and a connection line "g" connected to the control electrode of the switch element 49.

The charging action of the flash device circuit in the flash mode is performed as follows. When the charged voltage of the main capacitor 21 is lower than the predetermined changeover voltage V1 shown in FIG. 5, the main capacitor 21 is charged first by using the boosting circuit (or converter) of the flyback type, which does not bring about any initial flow of rush current.

For the flyback-type boosting circuit action, the CPU 125 controls, through the connection lines "a" and "f", the switch element 6 and the switch element 47 by turning them on or off. In other words, to start charging the main capacitor 21 with the flyback-type boosting circuit, the CPU 125 outputs a high level signal to the connection line "f" to turn on (to render conductive) the switch element 47. After that, a predetermined oscillation signal is given to the control electrode of the switch element 6 through the connection line "a" . The predetermined oscillation signal is arranged to be such that a high level signal and a low level signal are repeatedly outputted in a predetermined cycle as described in the foregoing.

With the switch element 6 rendered conductive by the high level signal through the connection line "a", a current from the battery 1 flows, as a base current of the oscillation transistor 4, through the base and emitter of the oscillation transistor 4, the current limiting resistor 5 and the switch element 6. Then, a collector current which is "hfe" times as large as the base current flows from the battery 1 through the primary winding P of an oscillation transformer 51 and the switch element 47.

The collector current brings about an induced electromotive force in the secondary winding S of the oscillation transformer 51. However, since the induced electromotive force is of such a polarity that is blocked by the high-voltage rectifying diode 17, no charging current flows to the main capacitor 21, so that energy is stored in the oscillation transformer 51.

Next, when the connection line "a" is caused to be at a low level to give a low level signal to the control electrode of the switch element 6, the switch element 6 turns off to become nonconductive and to cut off the base current of the oscillation transistor 4. The oscillation transistor 4 is rendered nonconductive by this. The potential of the secondary winding S of the oscillation transformer 51 is inverted to generate a back electromotive force. Then, the energy stored in the oscillation transformer 51 is discharged by the back electromotive force to cause a charging current to flow to the main capacitor 21 through the high-voltage rectifying diode 17.

With the energy discharged further from within the oscillation transformer 51, when a high level signal is again given to the control electrode of the switch element 6 through the connection line "a", the switch element 6 and the oscillation transistor 4 again become conductive to store energy in the oscillation transformer 51. After that, when a low level signal is given to the control electrode of the switch element 6, the switch element 6 and the oscillation transistor 4 become nonconductive, so that the energy stored in the oscillation transformer 51 is discharged to charge the main capacitor 21 with electric charge. In the flash device circuit, the potential of the main capacitor 21 is caused to rise by repeating these actions.

While the main capacitor 21 is in process of being charged by repeating these actions as mentioned above, the charged voltage of the main capacitor 21 is detected by the voltage detecting circuit 18 in response to a voltage detection driving signal sent from the CPU 125 through the connection line "c". The voltage detecting circuit 18 then sends a divided voltage of the charged voltage thus detected to the CPU 125 through the connection line "d" (at step S22 of FIG. 4)

When the charged voltage of the main capacitor 21 is found by the CPU 125 through the A/D converter (FIG. 2) to have reached the predetermined changeover voltage V1 on the basis of the result of the voltage detection, the use of the boosting circuit is changed from the flyback type over to the forward type (at steps S23 and S24).

In effecting the changeover of the boosting circuit, the CPU 125 sends low level signals respectively from the connection lines "a" and "f" to keep the switch elements 6 and 47 nonconductive, sends a high level signal from the connection line "g" to keep the switch element 49 in an on-state (conductive), and then sends the predetermined oscillation signal from the connection line "b" to bring the switch element 45 into an on-off oscillating state.

With the high level signal given to the switch element 45 through the connection line "b", the switch element 45 becomes conductive. Then, a current from the battery 1 flows as a base current of the oscillation transistor 43 through the base and emitter of the oscillation transistor 43, the current limiting resistor 44 and the switch element 45. Then, a collector current which is "hfe" times as large as the base current flows from the battery 1 through the primary winding P of the oscillation transformer 51 and the switch element 49.

This collector current brings about an induced electromotive force at the secondary winding S of the oscillation transistor 51. Since the direction of the collector current generated this time is reverse to that of the force last generated, the induced electromotive force of the secondary winding S of the oscillation transformer 51 is not blocked by the high-voltage rectifying diode 17 and is allowed to flow through the high-voltage rectifying diode 17 to the main capacitor 21 as a charging current.

In the case of the flash device circuit according to the third embodiment, a low level signal is arranged to be given to the control electrode of the switch element 45 through the connection line "b" before the saturation of the magnetic flux within the core of the oscillation transformer 51. The low level signal turns off the switch element 45 and the oscillation transistor 43 to render them nonconductive and to annihilate the magnetic flux. A high level signal is given again to the switch element 45 at the timing when the magnetic flux is annihilated within the core of the oscillation transformer 51. The potential of the main capacitor 21 is raised by causing the switch element 45 and the oscillation transistor 43 to be repeatedly turned on and off in the manner described above.

The actions to be performed after the actions described above are the same as the steps S25 to S31 described in the foregoing with reference to FIG. 4.

(Fourth Embodiment)

Figure 8:
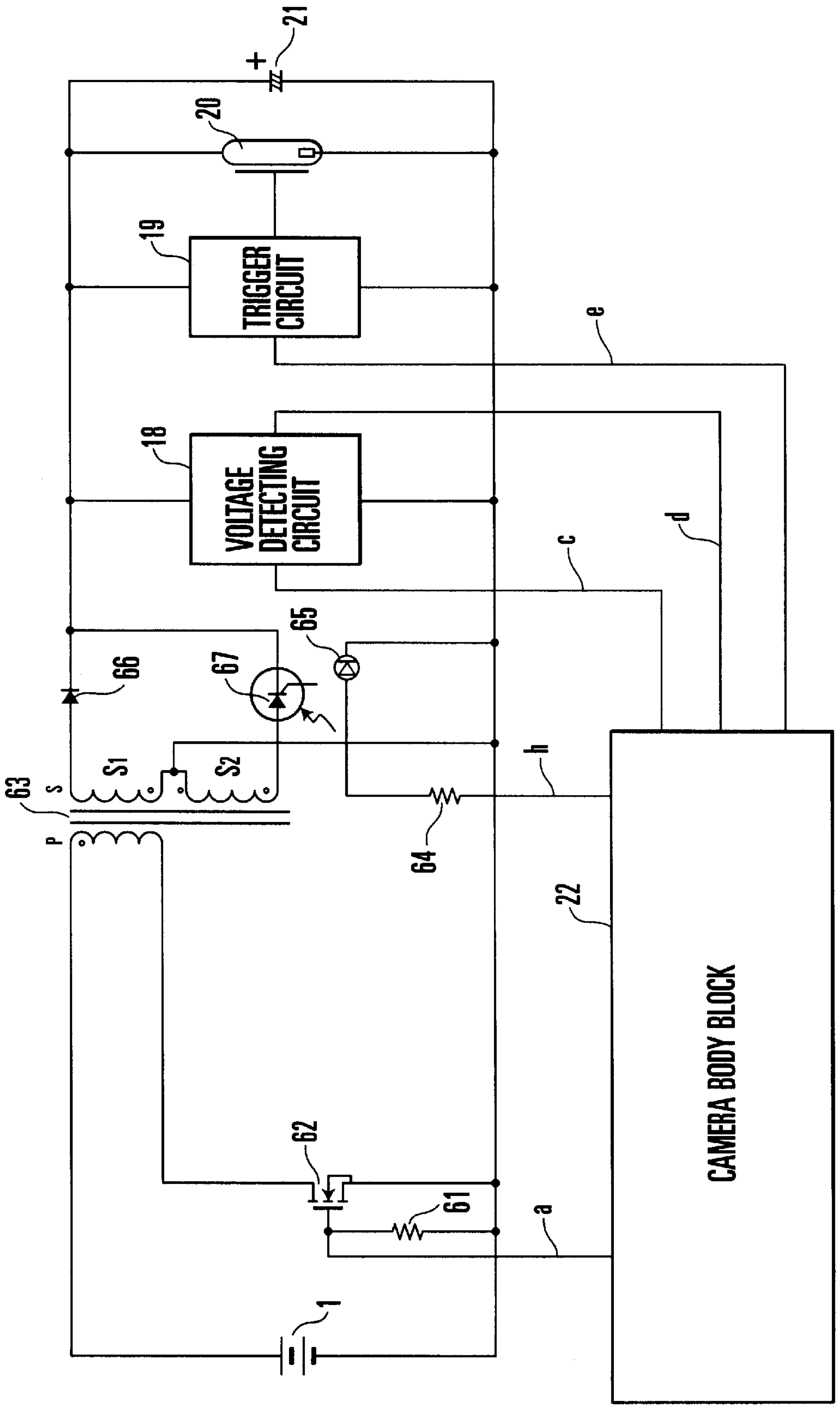
FIG. 8 is a block diagram showing the arrangement of a flash device circuit according to a fourth embodiment of the invention.

FIG. 8 shows the arrangement of a flash device circuit according to a fourth embodiment of the invention. While a separately-excited converter (boosting circuit) of the fourth embodiment is arranged to be changed between the flyback type and the forward type in the same manner as in the other embodiments described above, the flash device circuit according to the fourth embodiment differs in the following point. In the case of the fourth embodiment, a transformer has its secondary winding S provided with an intermediate electrode, and a secondary current is arranged to be switched from one current over to another by using this intermediate electrode.

In FIG. 8, all components, connection lines, etc., that are the same as those of the embodiments described in the foregoing are indicated by the same reference numerals and symbols, and the details of them are omitted from the following description. The sequence of processes of the main routine shown in FIG. 3 and the sequence of control actions in the flash mode shown in FIG. 4 are executed by the fourth embodiment in the same manner as described in the foregoing. The following description, therefore, covers only the arrangement and the charging action of the flash device circuit.

Referring to FIG. 8, the flash device circuit includes a resistor 61 and an oscillation element 62. The resistor 61 is a pull-down resistance for the oscillation element 62. The flash device circuit further includes an oscillation transformer 63, a resistor 64, a light emitting diode 65, a high-voltage rectifying diode 66, and the so-called light-activated thyristor 67, which becomes conductive upon receiving light illumination.

The oscillation transformer 63 has one end (side) of its primary winding P connected to the positive pole of the battery 1 and the other end (side) of the primary winding P connected to the negative pole of the battery 1 through the oscillation element 62. The secondary winding S of the oscillation transformer 63 has its one end connected to one end of the main capacitor 21 through the high-voltage rectifying diode 66 and the other end connected to the anode of the light-activated thyristor 67. Further, the secondary winding S of the oscillation transformer 63 is provided with an intermediate electrode, which divides the secondary winding S into a secondary winding $S_1$ and a secondary winding $S_2$, as shown in FIG. 8. The intermediate electrode of the secondary winding S is connected to the other end of the main capacitor 21.

In the fourth embodiment, among the connection lines arranged to connect the flash device circuit to the CPU 125 of the camera body block 22, the connection line "b" is replaced with a connection line "h", which is provided for outputting electric power to the light emitting diode 65.

The charging action of the flash device circuit in the flash mode in the fourth embodiment is performed as follows. When the charged voltage of the main capacitor 21 is lower than the predetermined changeover voltage V1 shown in FIG. 5, the main capacitor 21 is charged first by using the boosting circuit of the flyback type, which does not bring about any initial flow of rush current.

The flyback-type boosting circuit acts as follows. The CPU 125 controls the oscillation element 62 to make the oscillation element 62 conductive and nonconductive. In this case, a separately-excited oscillation signal which becomes a high level and a low level at a predetermined frequency is given through the connection line "a" to the control electrode of the oscillation element 62.

When the oscillation element 62 is rendered conductive by the high level signal of the connection line "a", a current flows from the battery 1 through the primary winding P of the oscillation transformer 63 and the oscillation element 62. This current brings about an induced electromotive force at the secondary winding $S_1$ of the oscillation transformer 63. However, since the induced electromotive force is of such a polarity that is blocked by the high-voltage rectifying diode 66, no charging current flows to the main capacitor 21, so that energy is stored in the oscillation transformer 63. An induced electromotive force is generated also at the secondary winding $S_2$. However, since the light-activated thyristor 67 is in an off-state, there is also no flow of charging current to the main capacitor 21.

When a low level signal is next given to the control electrode of the oscillation element 62 with the level of the connection line "a" becoming low, the oscillation element 62 turns off (becomes nonconductive) to cut off the current flow to the oscillation transformer 63. Therefore, the potential of the secondary winding S of the oscillation transformer 63 is inverted to generate a back electromotive force. By this back electromotive force, the energy stored in the oscillation transformer 63 is discharged. Then, a charging current flows to the main capacitor 21 through a loop of "the secondary winding $S_1$-the high-voltage rectifying diode 66-the main capacitor 21".

With the energy discharged further from within the oscillation transformer 63, when a high level signal is again given to the control electrode of the oscillation element 62 through the connection line "a", the oscillation element 62 becomes conductive to allow the oscillation transformer 63 to store energy in the same manner again. After that, the next low level signal given to the control electrode of the oscillation element 62 renders the oscillation element 62 nonconductive to cause the oscillation transformer 63 to discharge the stored energy, so that the main capacitor 21 is charged with electric charge. The potential of the main capacitor 21 in the flash device circuit is thus caused to rise with these actions repeated.

While the main capacitor 21 is being charged by repeating the actions mentioned above, the charged voltage of the main capacitor 21 is detected by the voltage detecting circuit 18 in response to a voltage detection driving signal coming from the CPU 125 through the connection line "c". The voltage detecting circuit 18 then sends a divided voltage of the charged voltage of the main capacitor 21 thus detected to the CPU 125 through the connection line "d" (step S22 of FIG. 4)

When the charged voltage of the main capacitor 21 is found by the CPU 125 through the A/D converter (FIG. 2) to have reached the predetermined changeover voltage V1 on the basis of the result of the voltage detection, the use of the boosting circuit is changed from the flyback type over to the forward type (steps S23 and S24).

In effecting the changeover of the boosting circuit, the CPU 125 sends a low level signal from the connection line "a" to temporarily render the oscillation element 62 nonconductive, and then outputs an electric current from the connection line "h".

The current outputted from the connection line "h" is limited by the resistor 64 and flows through the light emitting diode 65 to cause the light emitting diode 65 to light up. Then, the light from the light emitting diode 65 illuminates the light-activated thyristor 67 to render the light-activated thyristor 67 conductive.

In the case of the fourth embodiment, the state of having the light emitting diode 65 alight and rendering the light-activated thyristor 67 conductive is arranged to continue until the voltage of the main capacitor 21 reaches the charging completion voltage V1. Under this condition, the oscillation signal of the forward type the level of which repeatedly becomes high and low in a predetermined cycle is given from the CPU 125 to the control electrode of the oscillation element 62 through the connection line "a".

With the high level signal given to the oscillation element 62 through the connection line "a", the oscillation element 62 becomes conductive to allow a primary current to flow from the battery 1 to the primary winding P of the oscillation transformer 63. The primary current brings about an induced electromotive force at the secondary winding $S_2$ of the oscillation transformer 63. Then, since the light-activated thyristor 67 is in a conductive state this time, a charging current flows from the anode to the cathode of the light-activated thyristor 67 and through the main capacitor 21 and the intermediate electrode of the oscillation transformer 63.

Next, before the saturation of the magnetic flux within the core of the oscillation transformer 63, a low level signal is given to the control electrode of the oscillation element 62 through the connection line "a". The low level signal causes the oscillation element 62 to turn off (to become nonconductive) to bring the flow of the primary current of the oscillation transformer 63 to a stop. As a result, the magnetic flux within the core decreases. Then, at the timing of annihilation of the magnetic flux within the core, a high level signal is given again to the control electrode of the oscillation element 62 through the connection line "a".

After that, the potential of the main capacitor 21 is caused to rise by repeatedly causing the oscillation element 62 to turn on and off in the above-stated manner. The actions to be performed thereafter are the same as the steps S25 to S31 of FIG. 4 described in the foregoing.

Further, the flash device circuit according to the fourth embodiment is arranged to avoid the interference of the secondary winding $S_2$ of the oscillation transformer 63 by means of the high-voltage rectifying diode 66. However, this arrangement may be changed to use a light-activated thyristor and a light emitting diode in place of the high-voltage rectifying diode 66.

(Fifth Embodiment)

Figure 9:
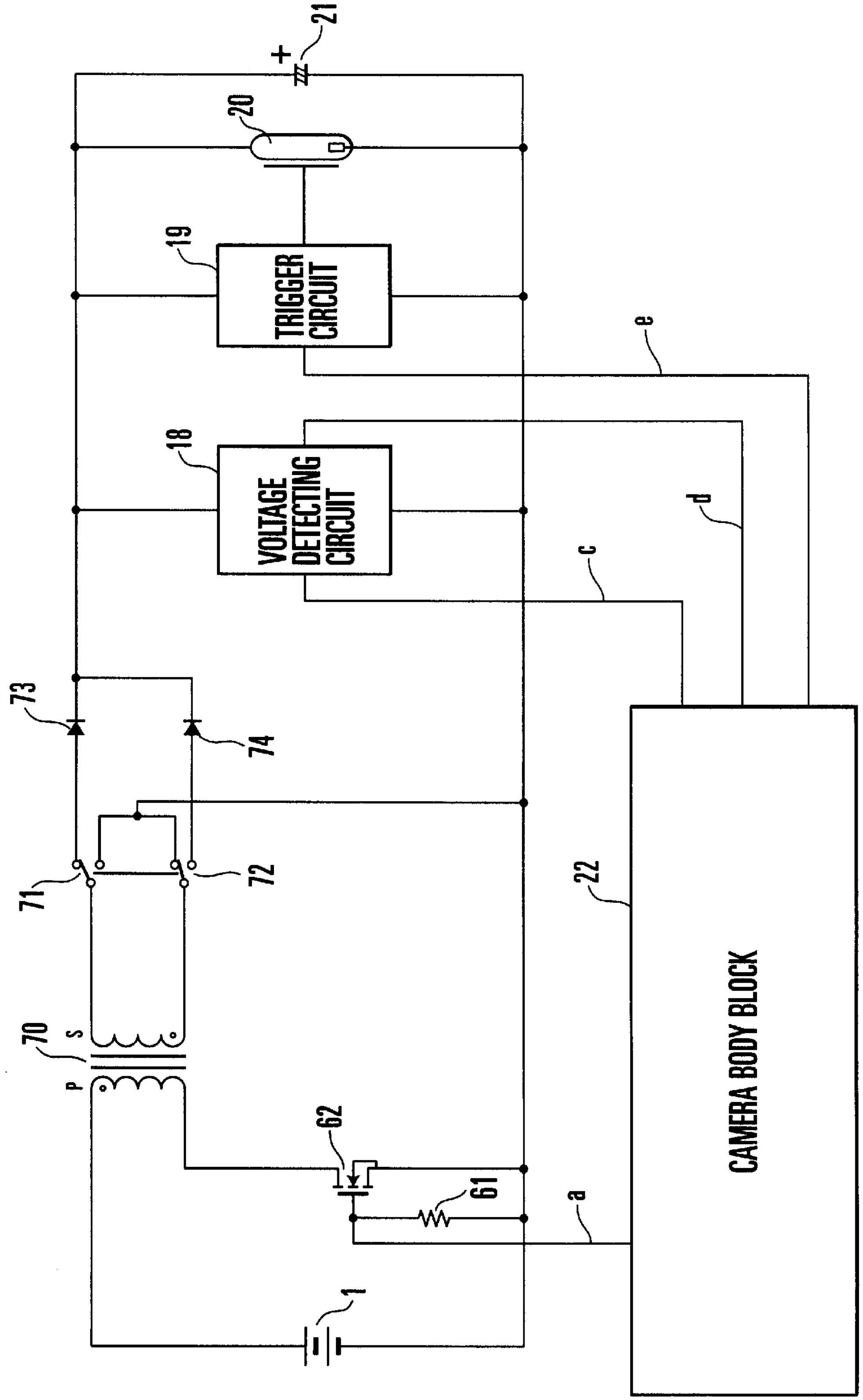
FIG. 9 is a block diagram showing the arrangement of a flash device circuit according to a fifth embodiment of the invention.

FIG. 9 shows the arrangement of a flash device circuit according to a fifth embodiment of the invention. While a separately-excited converter (boosting circuit) in the fifth embodiment is arranged to be changed between the flyback type and the forward type in the same manner as in the other embodiments described above, the flash device circuit according to the fifth embodiment differs in the following point. In the case of the fifth embodiment, the secondary current of one and the same transformer is changed over by a switch means.

In FIG. 9, all components, connection lines, etc., that are the same as those of the embodiments described in the foregoing are indicated by the same reference numerals and symbols, and the details of them are omitted from the following description. The sequence of processes of the main routine shown in FIG. 3 and the sequence of control actions in the flash mode shown in FIG. 4 are executed by the fifth embodiment in the same manner as described in the foregoing. The following description, therefore, covers only the arrangement and the charging action of the flash device circuit in the fifth embodiment.

Referring to FIG. 9, the flash device circuit includes an oscillation transformer 70, switches 71 and 72 which are interlocked with each other, and high-voltage rectifying diodes 73 and 74. In the same manner as the oscillation transformer 63 shown in FIG. 8, the primary winding P of the oscillation transformer 70 has one end connected to the positive pole of the battery 1 and the other end connected to the negative pole of the battery 1 through the oscillation element 62.

On the other hand, the secondary winding S of the oscillation transformer 70 has, in the state shown in FIG. 9, one end thereof connected to one end of the main capacitor 21 through the switch 71 and the high-voltage rectifying diode 73 and the other end thereof connected to the other end of the main capacitor 21 through the switch 72. When the connecting positions of the switches 71 and 72 are switched from this state in association with each other, the one end of the secondary winding S of the oscillation transformer 70 is connected to the other end of the main capacitor 21 through the switch 71 and the other end of the secondary winding S of the oscillation transformer 70 is connected to the one end of the main capacitor 21 through the switch 72 and the high-voltage rectifying diode 74.

Further, the high-voltage rectifying diodes 73 and 74 have their cathodes respectively connected to one end of the main capacitor 21 and their anodes connected respectively to one end and the other end of the secondary winding S of the oscillation transformer 70 through the terminals of the switches 71 and 72.

The charging action of the flash device circuit in the flash mode in the fifth embodiment is performed as follows. When the charged voltage of the main capacitor 21 is lower than the predetermined changeover voltage V1 shown in FIG. 5, the main capacitor 21 is charged first by using the boosting circuit of the flyback type, which does not bring about any initial flow of rush current.

The flyback-type boosting circuit action is as follows. The connecting positions of the switches 71 and 72 are first set into the state shown in FIG. 9. The CPU 125 then causes a separately-excited oscillation signal which becomes high and low levels at a predetermined frequency to be given through the connection line "a" to the control electrode of the oscillation element 62.

When the oscillation element 62 is rendered conductive by the high level signal of the connection line "a", a current flows from the battery 1 through the primary winding P of the oscillation transformer 70. The current brings about an induced electromotive force at the secondary winding S of the oscillation transformer 70. However, since the induced electromotive force is of such a polarity that is blocked by the high-voltage rectifying diode 73, no charging current flows to the main capacitor 21, so that energy is stored in the oscillation transformer 70.

When a low level signal is next given to the control electrode of the oscillation element 62 with the level of the connection line "a" becoming low, the oscillation element 62 turns off (becomes nonconductive) to cut off the current flow to the oscillation transformer 70. Therefore, the potential of the secondary winding S of the oscillation transformer 70 is inverted to bring about a back electromotive force. By this back electromotive force, the energy stored in the oscillation transformer 70 is discharged. Then, a charging current flows to the main capacitor 21 through a loop of "the secondary winding S-the switch 71-the high-voltage rectifying diode 73-the main capacitor 21-the switch 72".

With the energy discharged further from within the oscillation transformer 70, when a high level signal is again given to the control electrode of the oscillation element 62 through the connection line "a", the oscillation element 62 again becomes conductive to allow the oscillation transformer 70 to store energy in the same manner. After that, the next low level signal given to the control electrode of the oscillation element 62 renders the oscillation element 62 nonconductive to cause the oscillation transformer 70 to discharge the stored energy, so that the main capacitor 21 is charged with electric charge. The potential of the main capacitor 21 in the flash device circuit is thus caused to rise with these actions repeated.

While the main capacitor 21 is being charged by repeating these actions as mentioned above, the charged voltage of the main capacitor 21 is detected by the voltage detecting circuit 18 in response to a voltage detection driving signal coming from the CPU 125 through the connection line "c". The voltage detecting circuit 18 then sends a divided voltage of the charged voltage thus detected to the CPU 125 through the connection line "d" (step S22 of FIG. 4).

When the charged voltage of the main capacitor 21 is found by the CPU 125 through the A/D converter (FIG. 2) to have reached the predetermined changeover voltage V1 on the basis of the result of the voltage detection, the use of the boosting circuit is changed from the flyback type over to the forward type (steps S23 and S24).

In effecting the changeover of the boosting circuit, the CPU 125 sends a low level signal from the connection line "a" to temporarily render the oscillation element 62 nonconductive and then switches the connecting positions of the switches 71 and 72 over to their other connecting positions in association with each other. After that, the oscillation element 62 is brought into an on-off oscillating state by outputting a high-level/low-level signal in a predetermined cycle of the forward type to the connection line "a".

When the high level signal is given through the connection line "a" to the oscillation element 62, the oscillation element 62 becomes conductive to allow a primary current to flow from the battery 1 to the primary winding P of the oscillation transformer 70. The primary current brings about an induced electromotive force at the secondary winding S of the oscillation transformer 70. Since the induced electromotive force is of such a polarity that is not blocked by the high-voltage rectifying diode 74, a charging current flows to the main capacitor 21 through the high-voltage rectifying diode 74.

Next, before the saturation of the magnetic flux within the core of the oscillation transformer 70, a low level signal is given to the control electrode of the oscillation element 62 through the connection line "a". The low level signal causes the oscillation element 62 to turn off (to become nonconductive) to bring the flow of the primary current of the oscillation transformer 70 to a stop. As a result, the magnetic flux within the core decreases. Then, at the timing of annihilation of the magnetic flux within the core, a high level signal is given again to the control electrode of the oscillation element 62 through the connection line "a".

After that, the potential of the main capacitor 21 is caused to rise by repeatedly causing the oscillation element 62 to turn on and off in the above-stated manner. The actions to be performed thereafter are the same as the steps S25 to S31 of FIG. 4 described in the foregoing.

For switching the connecting positions of the switches 71 and 72, a plunger or a motor may be used if these switches are mechanical switches. Further, the switches 71 and 72 may be electrical switches.

(Sixth Embodiment)

A sixth embodiment of the invention is next described with reference to FIG. 10 which is a flow chart. A sequence of control actions in the flash mode (steps S10 or S19 in FIG. 3) in the sixth embodiment differs from those of the other embodiments described with reference to FIG. 4. With the exception of this point, the flash device circuit according to the sixth embodiment may be arranged in the same manner as in the case of any of the embodiments described above.

In the sequence of control actions in the flash mode shown in FIG. 4, the use of the boosting circuit is arranged to be changed between the flyback type and the forward type according to whether or not the charged voltage of the main capacitor 21 has reached a changeover voltage level. In the case of the sixth embodiment, however, a timer which is provided solely for changeover of the boosting circuit is used in changing the boosting circuit between the flyback type and the forward type.

A control operation on the flash device circuit in the flash mode according to the sixth embodiment is described below referring to the flow chart of FIG. 10. In FIG. 10, all steps of processes which are the same as the steps shown in the FIG. 4 are indicated by the same step numbers as in FIG. 4, and the details thereof are omitted from the description.

Figure 10:
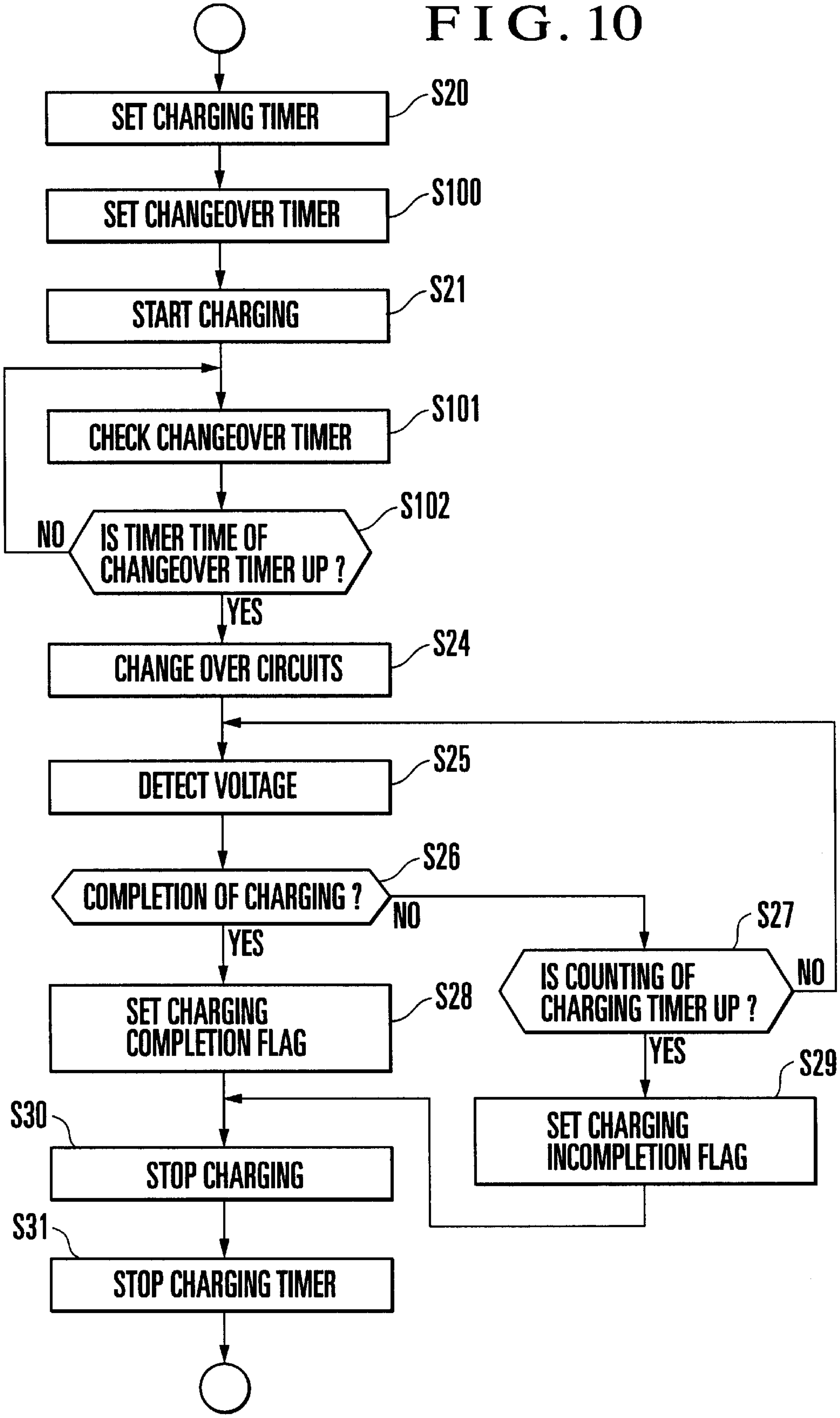
FIG. 10 is a flow chart showing actions to be performed in a flash mode according to a sixth embodiment of the invention.

At step S20 of FIG. 10, in the flash mode, the CPU 125 sets the above-mentioned charging timer. At the next step S100, a boosting-circuit changeover timer is set at a time count value for changing from the flyback-type boosting circuit over to the forward-type boosting circuit.

In setting the time count value of the boosting-circuit changeover timer, the CPU 125 obtains an internal resistance value of the battery 1 from the open voltage of the battery 1 and a voltage obtained with a predetermined current allowed to flow on the basis of a detection value obtained from the voltage detecting circuit 18, and sets the predetermined time count value determined according to the state of the battery 1. In other words, while, in the above-described other embodiments, the voltage detecting circuit 18 detects the voltage of the main capacitor 21 itself by voltage division, the CPU 125 in the sixth embodiment predicts a charged state of the main capacitor 21 by finding the state of the battery 1 on the basis of a detection value obtained from the voltage detecting circuit 18, and sets, as the time count value of the boosting-circuit changeover timer, a changeover point (changeover time) required for efficiently boosting a voltage.

At the next step S21, to perform the flyback-type boosting circuit action, the CPU 125 sends a predetermined oscillation signal to the flash device circuit through an applicable connection line. This activates the flyback-type boosting circuit in the flash device circuit to cause a charging current to flow to the main capacitor 21. As a result, the potential of the main capacitor 21 rises.

At the next step S101, the CPU 125 checks the boosting-circuit changeover timer to find the time interval for changeover of the boosting circuit from the flyback type to the forward type. At step S102, a check is made for the arrival of the changeover time. The steps S101 and S102 are repeated to continue the process for the flyback-type charging until the arrival of the changeover time.

When the arrival of the changeover time is found at the step S102, the flow of operation proceeds from the step S102 to step S24. At the step S24, the CPU 125 changes the use of the flyback-type boosting circuit for charging the main capacitor 21 over to the forward-type boosting circuit by sending to the applicable connection line the oscillation signal for the action of the forward-type boosting circuit.

Steps S25 to S31 which follow the step S24 are executed in the same manner as already described in the foregoing with reference to FIG. 4 and are, therefore, omitted from the description.

While the invention is applied to a camera of the kind having a built-in flash device in the case of each of the above-described embodiments, the invention is applicable also to a unitized electronic flash device.

What is claimed is:

1. A control circuit for a flash device having a main capacitor, a charging circuit having a flyback-type boosting circuit and a forward-type boosting circuit which differ in characteristic from each other and arranged to charge the main capacitor by boosting a voltage of a battery with one of the flyback-type boosting circuit and the forward-type boosting circuit, and a flash discharge tube arranged to emit flash light by discharging electric charge charged in the main capacitor, said control circuit comprising:

a detecting circuit which detects a charged state of the main capacitor; and a selection circuit which selectively causes one of the flyback-type boosting circuit and the forward-type boosting circuit to act, on the basis of a result of detection provided by said detecting circuit.

2. A control circuit according to claim 1, wherein said selection circuit performs changeover control of the charging circuit in such a way as to cause the flyback-type boosting circuit to act at the time of beginning of charging the main capacitor and to cause the forward-type boosting circuit to act according to a change in the charged state of the main capacitor.

3. A control circuit according to claim 2, wherein said detecting circuit detects a charged voltage of the main capacitor, and said selection circuit performs changeover control of the charging circuit in such a way as to cause the forward-type boosting circuit to act, when the charged voltage of the main capacitor has exceeded a predetermined threshold value, on the basis of a result of detection provided by said detecting circuit.

4. A control circuit according claim 2, wherein said detecting circuit detects a state of the battery from the charged state of the main capacitor, and calculates a predetermined length of time related to a charged voltage of the main capacitor set according to the state of the battery, and said selection circuit performs changeover control of the charging circuit in such a way as to cause the forward-type boosting circuit to act, when the predetermined length of time calculated by said detecting circuit has elapsed from the beginning of charging the main capacitor.

5. A control circuit according to claim 1, wherein the flyback-type boosting circuit and the forward-type boosting circuit respectively include oscillation transformers separate from each other.

6. A control circuit according to claim 1, wherein the flyback-type boosting circuit and the forward-type boosting circuit include an oscillation transformer in common.

7. A control circuit according to claim 1, wherein the flyback-type boosting circuit and the forward-type boosting circuit include in common an oscillation transformer provided with a center tap in a primary winding thereof, and wherein the center tap of the primary winding of the oscillation transformer is connected to one pole of the battery and two end sides of the primary winding of the oscillation transformer are connected to another pole of the battery, and the oscillation transformer is controlled by said selection circuit to cause a current of the battery to flow intermittently through one end side of the primary winding at the time of boosting with the flyback-type boosting circuit and through the other end of the primary winding at the time of boosting with the forward-type boosting circuit.

8. A control circuit according to claim 6, wherein a direction in which a current is caused to flow to a primary winding of the oscillation transformer varies between boosting with the flyback-type boosting circuit and boosting with the forward-type boosting circuit.

9. A control circuit according to claim 1, wherein the flyback-type boosting circuit and the forward-type boosting circuit include in common an oscillation transformer provided with a center tap in a secondary winding thereof, and wherein the center tap of the secondary winding of the oscillation transformer is connected to one end side of the main capacitor and two end sides of the secondary winding of the oscillation transformer are connected to another end side of the main capacitor, and the oscillation transformer causes a charging current to flow to the main capacitor through one end side of the secondary winding at the time of boosting with the flyback-type boosting circuit and through the other end side of the secondary winding at the time of boosting with the forward-type boosting circuit.

10. A control circuit according to claim 6, wherein a direction in which a charging current flows from a secondary winding of the oscillation transformer to the main capacitor varies between boosting with the flyback-type boosting circuit and boosting with the forward-type boosting circuit.

11. A control circuit for a flash device having a charging circuit which performs a boosting action on a voltage of a battery in a flyback-type manner and in a forward-type manner, and a capacitor arranged to be charged by the charging circuit, said control circuit comprising:

an action circuit arranged to cause the boosting action to be performed in the flyback-type manner at the time of beginning of charging the capacitor.

12. A control circuit for a flash device having a charging circuit which performs a boosting action on a voltage of a battery in a flyback-type manner and in a forward-type manner, and a capacitor arranged to be charged by the charging circuit, said control circuit comprising:

a setting circuit arranged to set the boosting action to one of the flyback-type manner and the forward-type manner according to a charged voltage state of the capacitor.

13. A control circuit according to claim 11, wherein said action circuit changes the boosting action from the flyback-type manner to the forward-type manner after a predetermined period of time elapses from the beginning of charging the capacitor.

14. A control circuit according to claim 12, wherein said setting circuit sets the boosting action to the flyback-type manner when a charged voltage of the capacitor is lower than a predetermined value.

15. A control circuit according to claim 14, wherein said setting circuit sets the boosting action to the forward-type manner when the charged voltage of the capacitor has exceeded the predetermined value.

16. A control circuit for a flash device having a charging circuit which performs a boosting action on a voltage of a battery in a flyback-type manner and in a forward-type manner, and a capacitor arranged to be charged by the charging circuit, said control circuit comprising:

a changeover circuit arranged to change the boosting action from the flyback-type manner to the forward-type manner when a rate of efficiency related to the ratio of energy charged in the capacitor to energy outputted from the battery in the flyback-type manner becomes coincident with or substantially coincident with a rate of efficiency related to the ratio of energy charged in the capacitor to energy outputted from the battery in the forward-type manner.

17. A control circuit according to claim 11, wherein a flyback-type boosting transformer and a forward-type boosting transformer are provided independently of each other.

18. A control circuit according to claim 11, wherein one transformer is provided for common use as a flyback-type boosting transformer and a forward-type boosting transformer.

19. A control circuit according to claim 18, further comprising a switch element arranged to change a direction of a current flowing to a primary winding of the transformer, a changeover action between the flyback-type manner and the forward-type manner being performed by changing the direction of the current.

20. A control circuit according to claim 19, further comprising a diode having an anode thereof connected to one terminal of a secondary winding of the transformer and a cathode thereof connected to one terminal of the capacitor.

21. A control circuit according to claim 18, further comprising a changeover circuit arranged to change a connection state between a first state in which one terminal of a secondary winging of the transformer is connected to one terminal of the capacitor and the other terminal of the secondary winding is connected to the other terminal of the capacitor and a second state in which the one terminal of the secondary winding is connected to the other terminal of the capacitor and the other terminal of the secondary winding is connected to the one terminal of the capacitor, a changeover action between the flyback-type manner and the forward-type manner being performed by changing the connection state.

22. A control circuit according to claim 21, further comprising a first diode connected between the one terminal of the secondary winding of the transformer and the one terminal of the capacitor in such a direction as to cause a current to flow from the secondary winding toward the capacitor in said first state, and a second diode connected between the other terminal of the secondary winding and the one terminal of the capacitor in such a direction as to cause a current to flow from the secondary winding toward the capacitor in said second state.

23. A control circuit for a flash device having a charging circuit which performs a boosting action on a voltage of a battery in a flyback-type manner and in a forward-type manner, and a capacitor arranged to be charged by the charging circuit, said control circuit comprising:

a changeover circuit arranged to change the boosting action from the flyback-type manner to the forward-type manner while the capacitor is in process of being charged.

24. A control circuit according to claim 23, wherein said changeover circuit changes the boosting action to the forward-type manner after a charging action on the capacitor in the flyback-type manner has been performed for a predetermined period of time.

25. A flash device having a charging circuit which performs a boosting action on a voltage of a battery in a flyback-type manner and in a forward-type manner, and a capacitor arranged to be charged by the charging circuit, said flash device comprising:

a changeover circuit arranged to change the boosting action from the flyback-type manner to the forward-type manner while the capacitor is in process of being charged.

26. A flash device according to claim 25, wherein said changeover circuit changes the boosting action from the flyback-type manner to the forward-type manner when a charged voltage of the capacitor has reached a predetermined value.

27. A flash device according to claim 25, wherein said changeover circuit changes the boosting action to the forward-type manner after a charging action on the capacitor in the flyback-type manner has been performed for a predetermined period of time.

28. A camera having a flash device having a charging circuit which performs a boosting action on a voltage of a battery in a flyback-type manner and in a forward-type manner, and a capacitor arranged to be charged by the charging circuit, said camera comprising:

a changeover circuit arranged to change the boosting action from the flyback-type manner to the forward-type manner while the capacitor is in process of being charged.

29. A camera according to claim 28, wherein said changeover circuit changes the boosting action from the flyback-type manner to the forward-type manner when a charged voltage of the capacitor has reached a predetermined value.

30. A camera according to claim 28, wherein said changeover circuit changes the boosting action to the forward-type manner after a charging action on the capacitor in the flyback-type manner has been performed for a predetermined period of time.

* * * * *

UNITED STATES PATENT AND TRADEMARK OFFICE

CERTIFICATE OF CORRECTION

PATENT NO. : 6,404,989 B2
DATED : June 11, 2002
INVENTOR(S) : Yukio Odaka

It is certified that error appears in the above-identified patent and that said Letters Patent is hereby corrected as shown below:

Column 10,
Line 30, delete "separatelyexciting" and insert -- separately-exciting --.

Signed and Sealed this

First Day of July, 2003

JAMES E. ROGAN
*Director of the United States Patent and Trademark Office*